May 22, 1945.  J. B. SUTTON  2,376,401
ROUND STRAIGHTENER
Filed Feb. 20, 1942  12 Sheets-Sheet 1
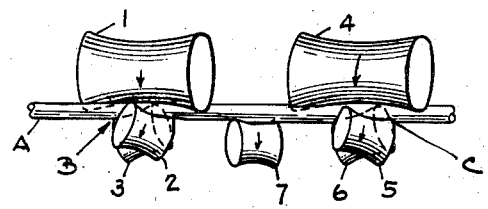
Fig. Ia
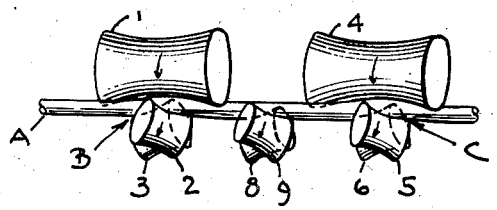
Fig. Ib
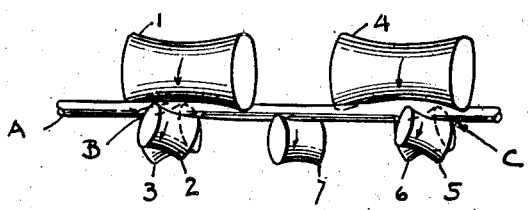
Fig. Ic
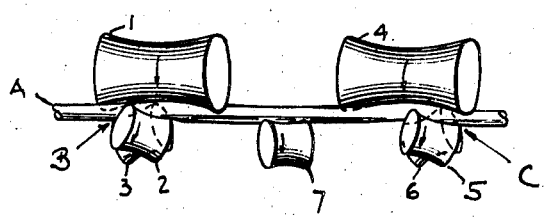
Fig. Id
INVENTOR.
John Blair Sutton
BY William B. Wharton
his ATTORNEY

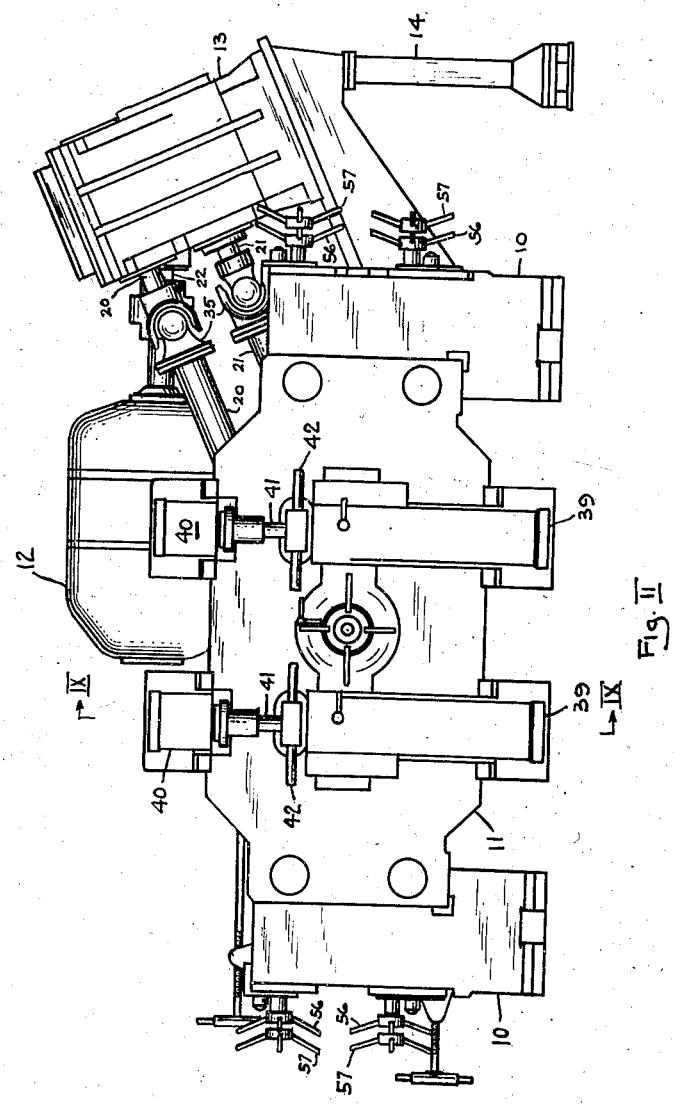

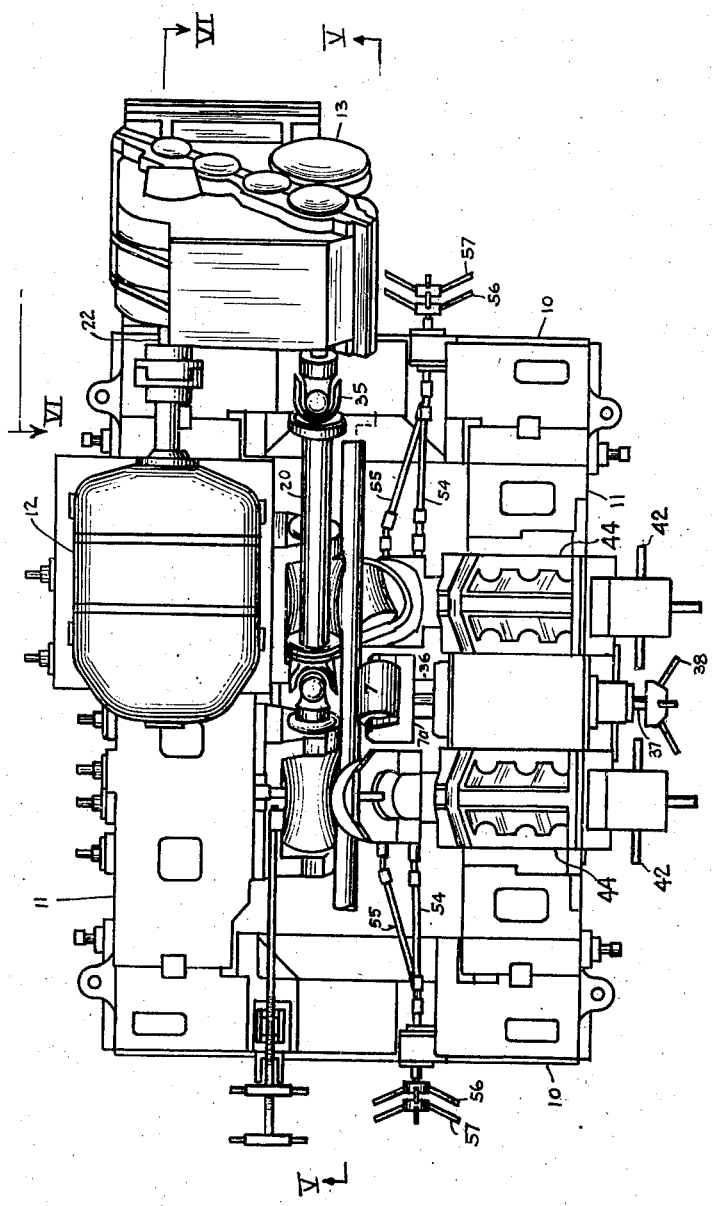

May 22, 1945.  J. B. SUTTON  2,376,401
ROUND STRAIGHTENER
Filed Feb. 20, 1942  12 Sheets-Sheet 4
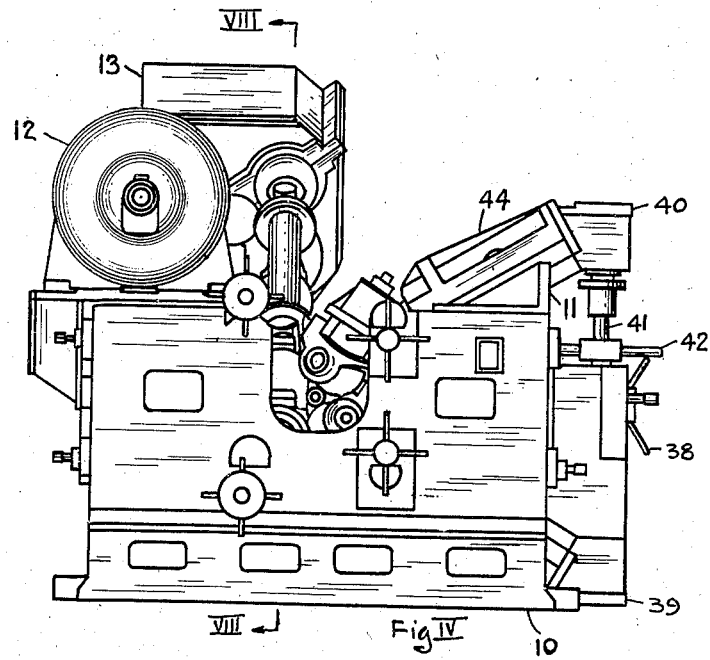
Fig IV
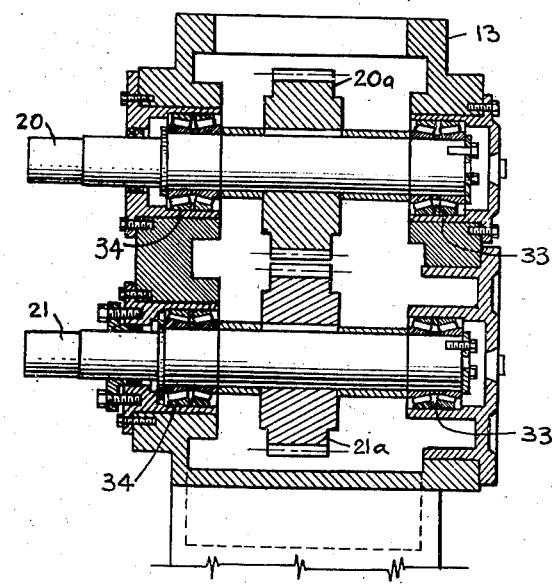
Fig. VIII
INVENTOR.
John Blair Sutton
BY William B. Wharton
his attorney

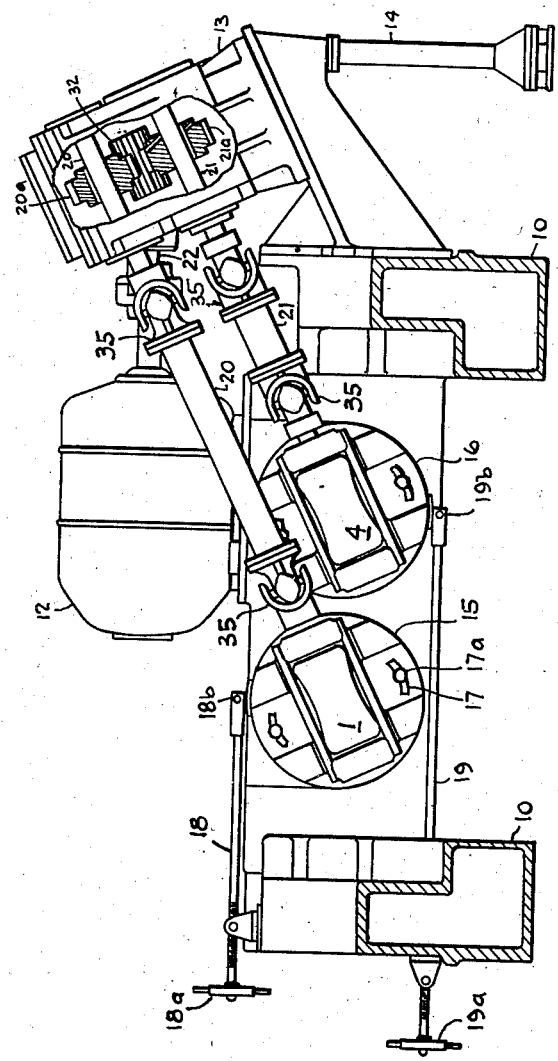
Fig. V

May 22, 1945.  J. B. SUTTON  2,376,401
ROUND STRAIGHTENER
Filed Feb. 20, 1942   12 Sheets-Sheet 6
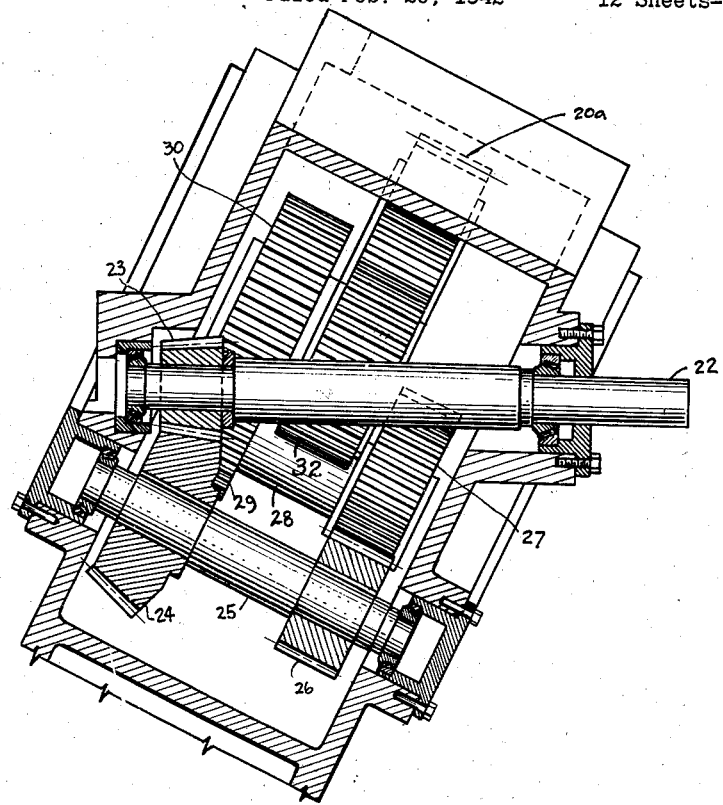
Fig VI
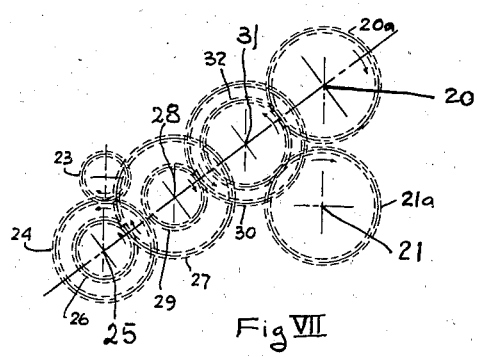
Fig VII
INVENTOR.
John Blair Sutton
BY William B. Wharton
his ATTORNEY May 22, 1945.  J. B. SUTTON  2,376,401
ROUND STRAIGHTENER
Filed Feb. 20, 1942    12 Sheets-Sheet 7
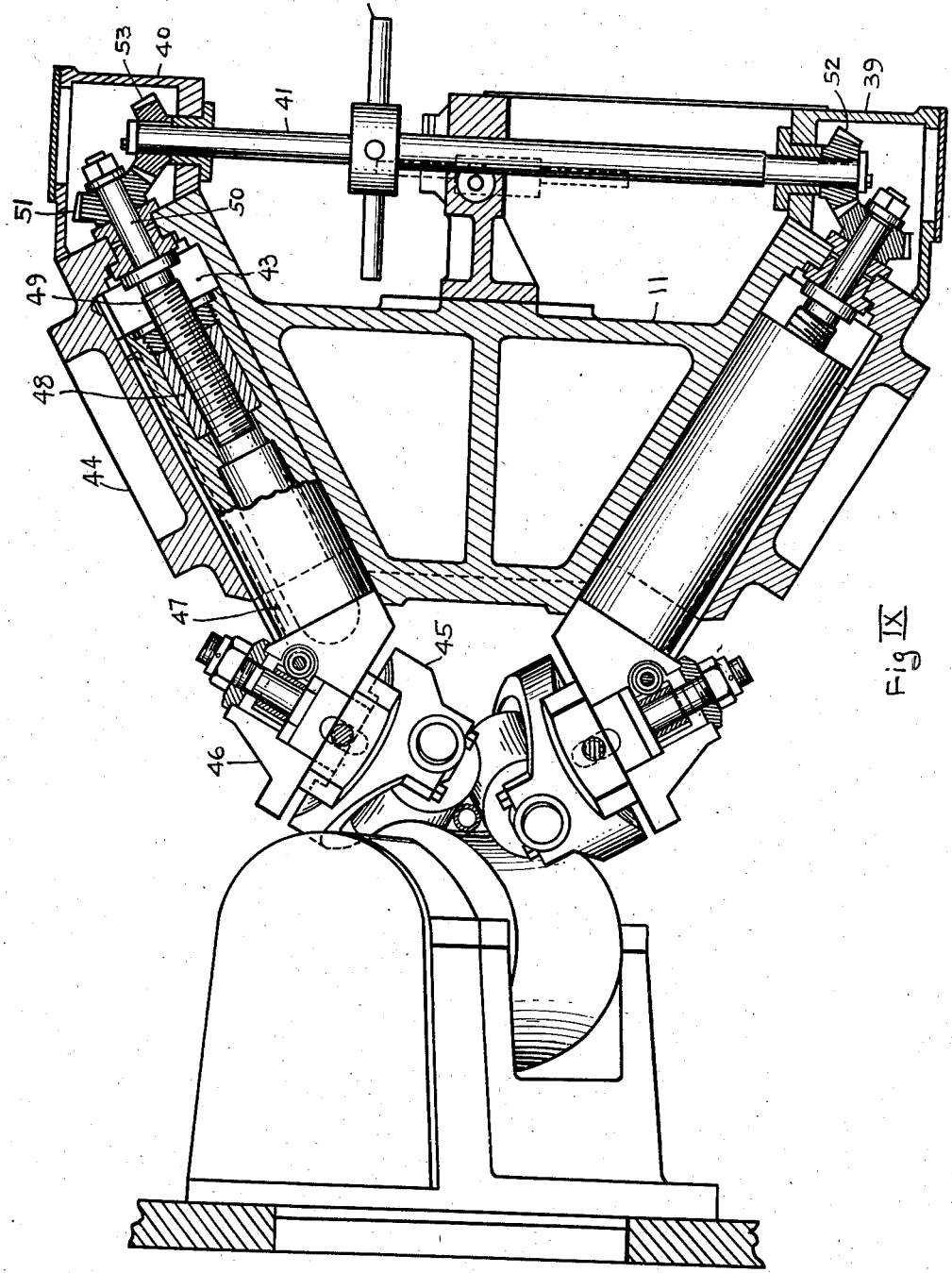
Fig IX
INVENTOR
John Blair Sutton
by William B. Wharton
his attorney May 22, 1945.   J. B. SUTTON   2,376,401
ROUND STRAIGHTENER
Filed Feb. 20, 1942   12 Sheets-Sheet 8
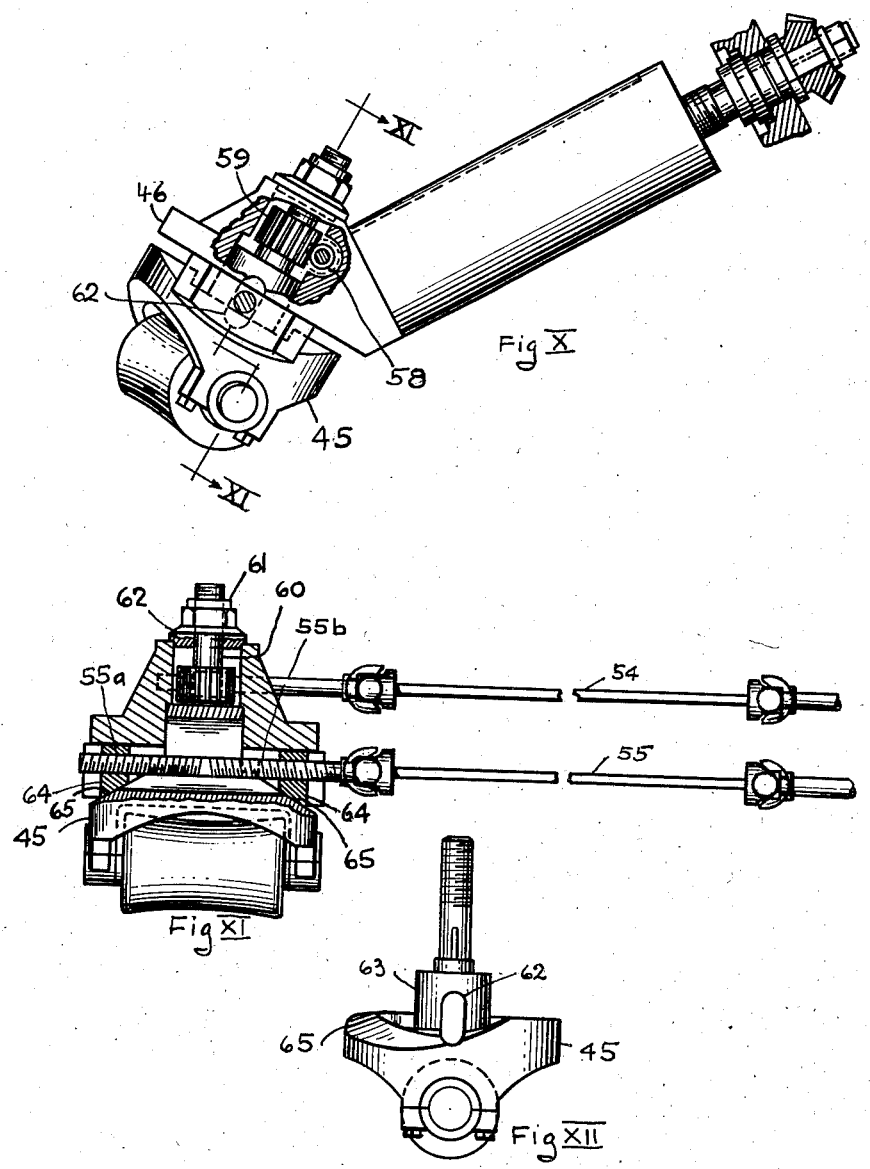
INVENTOR
John Blair Sutton
by William B. Wharton
his attorney

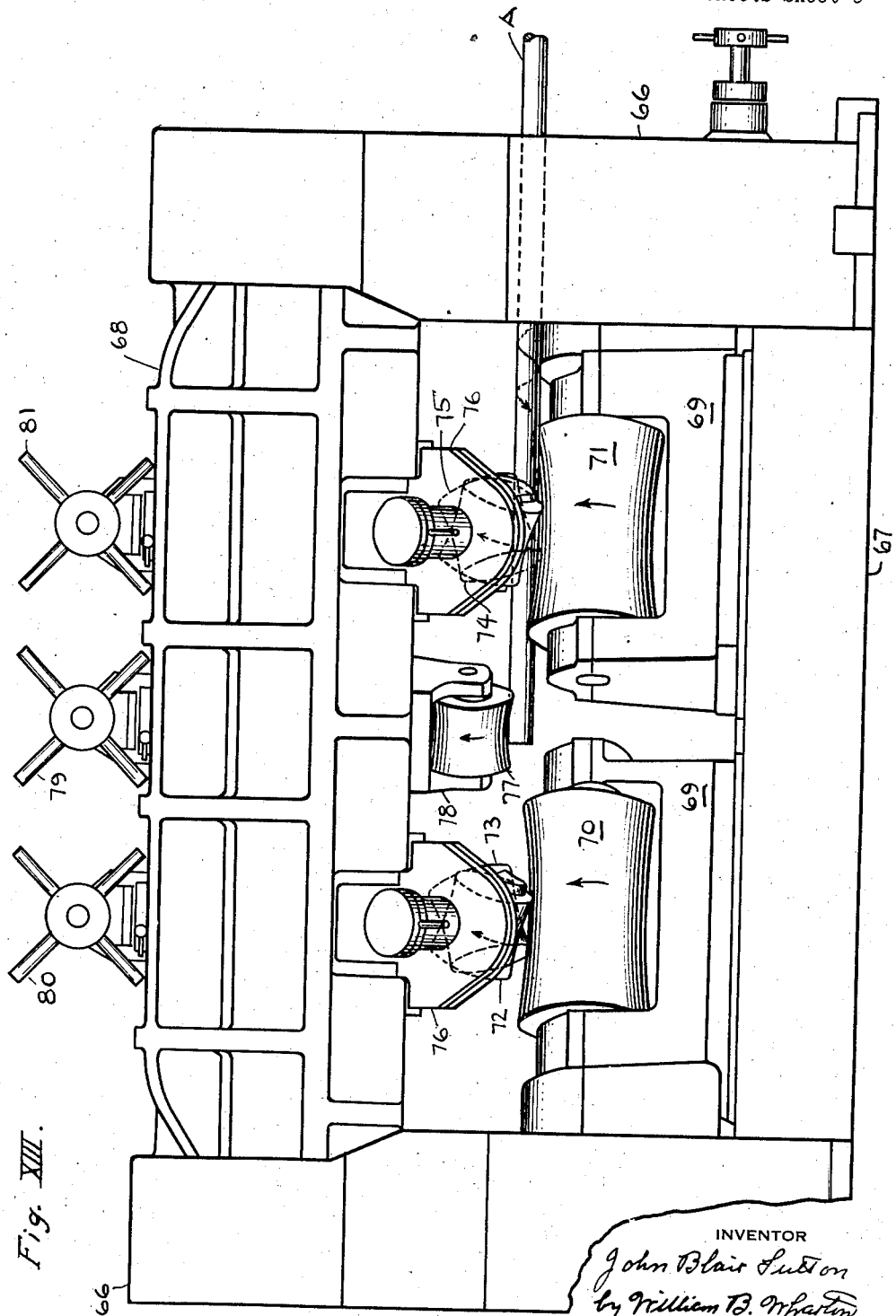

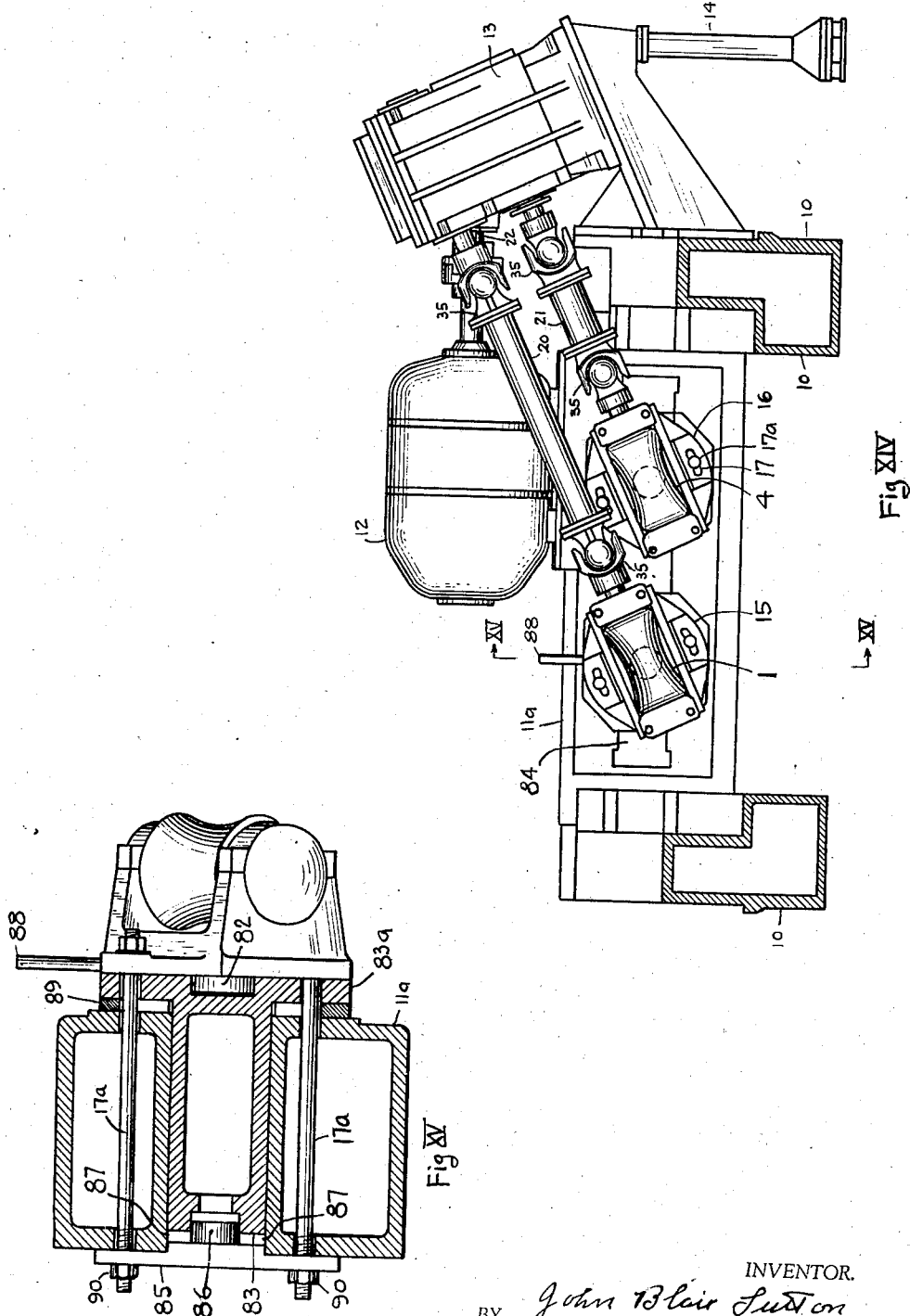

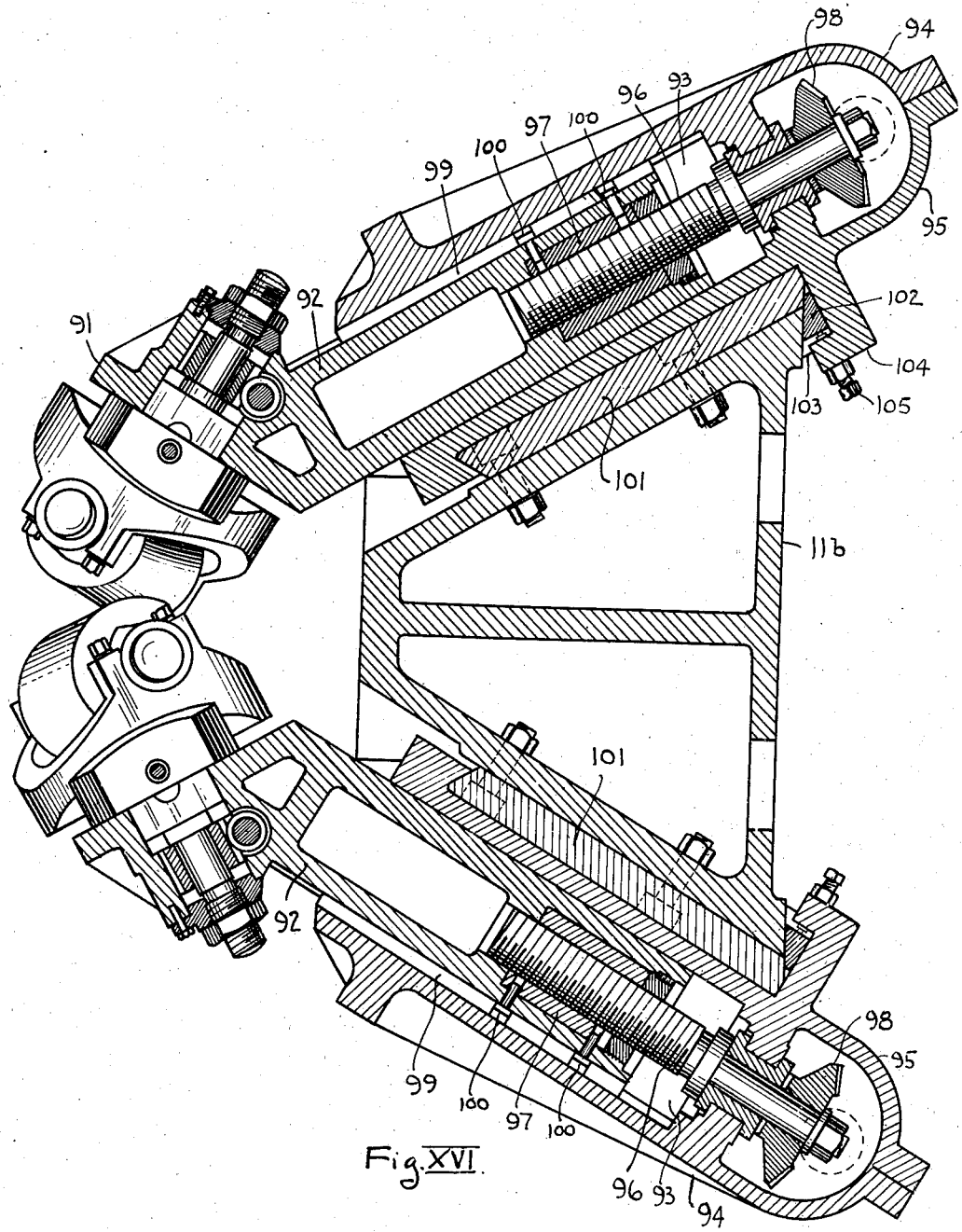

May 22, 1945.    J. B. SUTTON    2,376,401
ROUND STRAIGHTENER
Filed Feb. 20, 1942    12 Sheets-Sheet 12
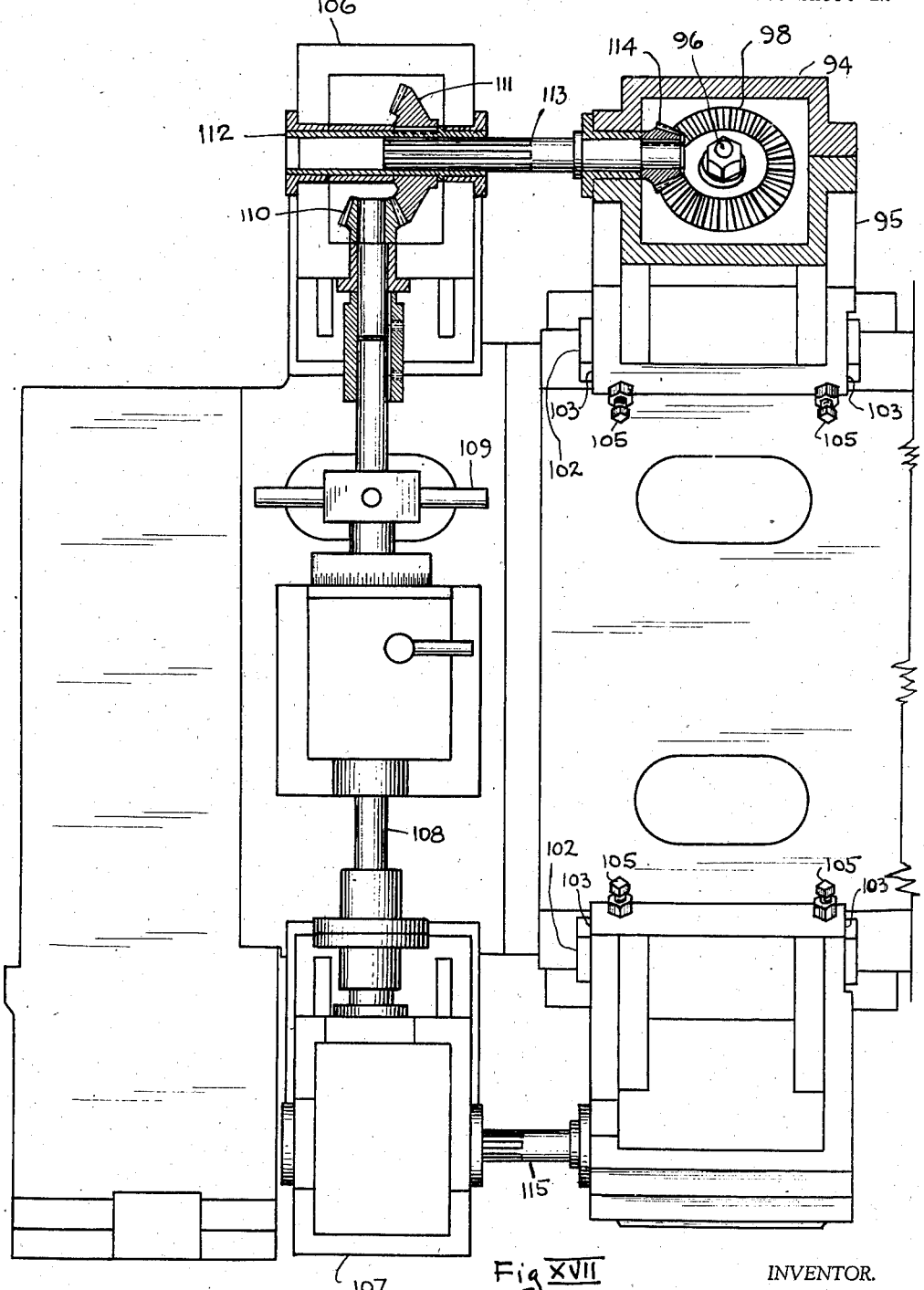
Fig XVII
INVENTOR.
John Blair Sutton
BY William B. Wharton
his attorney Patented May 22, 1945

2,376,401

UNITED STATES PATENT OFFICE 2,376,401

ROUND STRAIGHTENER

John Blair Sutton, Pittsburgh, Pa., assignor to Sutton Engineering Company, Pittsburgh, Pa., a corporation of Pennsylvania Application February 20, 1942, Serial No. 431,738

16 Claims. (Cl. 153—60)

This invention relates to round straightening and finishing apparatus for bars, rods and tubes of circular cross section. The application herein is a continuation-in-part of my application, Serial No. 350,390, filed August 3, 1940.

A cross-roll apparatus for round straightening which has become conventional in the art consists of two pairs of crossed rolls mounted in opposition to each other and spaced longitudinally of the apparatus frame. Either one or both rolls of each crossed pair are contoured, that is their surfaces are generated along centers to give in longitudinal section through the roll a cavity formed on a radius or radii. Usually the rolls of each crossed pair are unequal in size and the larger roll is driven while its opposed and smaller roll is an idler. Between the pairs of cross rolls there usually is a single pressure roll which may be brought to bear upon the stock between the centers provided by the opposed pairs. Such five-roll straightening apparatus operates upon stock in two primary ways. Each pair of rolls forms in itself a straightening pass in that the smaller and idler roll, which may be considered a secondary roll, forces the stock into the larger and positively driven roll, which may be considered the primary roll, so that as the stock passes longitudinally through the apparatus while rotating about its own axis it is subjected in both the passes formed by the opposed roll to a pressure tending to break down short bends or kinks. The effect of the pressure roll upon the stock as it is held in its progress between centers defined by the pairs of opposed rolls is a "gagging" one, and this pressure exerted upon the stock so held tends to straighten out long bends or sweeps.

In performing certain straightening or polishing operations on stock and in operating upon stock of some sorts, the intermediate pressure or gag roll is inactive, being withdrawn from the pass line defined by the two pairs of cooperative rolls, and in a machine purposed for specialized sizes may be wholly omitted from the organization.

The above being a fundamental organization of cross-roll apparatus for straightening and finishing stock of circular cross section, various modifications in such organization appear in specialized types of round straightening apparatus. For example, the secondary rolls are commonly made adjustable toward and from their associated primary rolls in accommodation to differences in the diameter of the stock which is subjected to the straightening or finishing operation, and it is now also accepted practice angularly to adjust both rolls about their axes so that in making accommodation to stock of different sizes the rolls may maintain substantial areas of contact with the stock to eliminate or lessen scroll marking of the stock under the pressure exerted on it by the rolls. Certain highly refined machines also provide for relative adjustment between the cooperative rolls of one or more of the cross-roll pairs longitudinally of the pass line, the better to preserve the line or area of contact of the stock with the cavity of the primary roll in making accommodation to greater or lesser diameter of the stock acted on in the apparatus. In certain apparatus organizations modification is made by positively driving both rolls of opposed pairs, and in certain instances two opposed rolls are utilized instead of a single gagging roll to provide intermediate deflection of the stock.

In cross-roll straightening and finishing apparatus it is customary to provide stationary guides vertically to limit the pass line in at least one dimension, and usually both to overlie and underlie the stock. Such guides hold the stock in the pass line, but by presenting stationary surfaces to the stock, moving longitudinally and rotating about its own axis, they tend in measure to mar the surface of the stock. Adjustment of the guides is an operation of time consuming sort, but previous attempts to eliminate them have been only partially successful in counteracting the tendency of the stock to leave the pass line, or because it has been necessary in them to exert an excessive pressure of the rolls on the stock in order to maintain it in the pass line. This latter condition is particularly disadvantageous in acting on thin-wall tubes.

Several objects relating to the improvement of cross-roll straightening are obtained by my invention, and by apparatus and method in which it finds embodiment, thus:

One object of my invention is to provide an apparatus in which stationary guides are eliminated, and in which the relatively high friction attendant upon movement of the stock against stationary bodies is replaced by rolling friction, with attendant elimination of or decrease in scroll marking of the stock, the stock being suitably held in the pass line through the apparatus without the use of stationary guides.

Another object of my invention is to provide cross-roll straightening and finishing apparatus in which the roll arrangement is such that the stock is directed through the apparatus and constrained in the pass line not only with lessened friction and lesser scroll marking than in apparatus which includes stationary guides, but in which the stock also is directed through the apparatus more accurately and is held more definitely to a true pass line than is possible by the provision of conventional stationary guides.

Another object of my invention is so to distribute the exertion of pressure of the cross rolls on the stock subjected to straightening and other finishing operations that distortion of the stock, and particularly of stock having the nature of thin-wall tubes, is greatly decreased by avoiding the opposed pressures of two cooperative cross rolls which is usual in conventionally organized straightening machines.

Another object of my invention is to provide a cross-roll straightening and finishing action on the stock with a decreased total exertion of pressure requisite to hold the stock in the pass line, thus decreasing the tendency of the apparatus rolls deformingly to work the stock with a consequent lessening in the tendency for the cross-rolling operation to injure the stock as by opening the seams of welded tubes, and with great improvement in the performance of polishing operations on the stock.

Another object of my invention attained by the distribution and moderation of localized pressure on the stock, as above noted, and while holding the stock accurately in the pass line without the use of stationary guides, is to accommodate in cross-rolling apparatus a wider range of stock sizes or diameters without axial angular adjustment of the rolls.

Another object of my invention sounding both in apparatus and in method and related to the objects above set forth, is to pass stock held accurately in the pass line at high speed through the apparatus while exerting on the stock a positive gripping obtained by a restrained bearing condition in the entering and leaving roll organizations of the apparatus so that the loading of the stock by the intermediate pressure roll is similar to the loading of a restrained beam.

Another object of my invention is to improve in the apparatus the adjustability of the apparatus to stock of different sizes and requiring different straightening conditions in its finishing by combining with the advantages above enumerated means for accommodating the straightening effect in each roll group, as a pass, to different sizes of stock, and in accommodating the apparatus organization as a whole to such different sizes and conditions.

In the accompanying drawings

Fig. Ia is a schematic view, which may be considered to be either in plan or in side elevation, illustrating a fundamental arrangement of elements in cross-rolling apparatus providing apparatus embodiment of my invention.

Fig. Ib is a view similar to Fig. Ia showing modification in one element of the apparatus organization.

Fig. Ic is a view similar to Fig. Ia, but illustrating a relationship of the elements which may be effected by a modification in the apparatus embodiment of my invention.

Fig. Id is a similar view showing an arrangement of the element which may be effected in another modification in the apparatus embodiment of my invention.

Fig. II is a side elevation of a machine providing a relatively unspecialized apparatus embodiment of my invention.

Fig. III is a plan view of the apparatus shown in Fig. II.

Fig. IV is an end elevation of the apparatus shown in Figs. II and III.

Fig. V is a vertical sectional view taken through the apparatus on the section line V—V of Fig. III, and having the gear case of the roll drive regionally broken away to show the ultimate roll-driving gears therein.

Fig. VI is a sectional detail view through the gear case which houses the roll-driving gears, taken in the plane of the section line VI—VI of Fig. III.

Fig. VII is a diagrammatic view of the organization of gears shown in Fig. VI.

Fig. VIII is a sectional detail view through the gear casing taken in the plane of the drive shafts for the rolls, as indicated at VIII—VIII of Fig. IV, showing the bearings for the drive shafts and the immediate gear connection thereto.

Fig. IX is a cross-sectional detail view taken in the plane of the section line IX—IX of Fig. II showing structure for adjusting a pair of rolls toward and from the pass line formed by them with another roll in one of the roll groups of the apparatus, the said other roll and its mounting being schematically illustrated, and showing means for angularly adjusting the yokes which carry the said paired rolls.

Fig. X is a detail view partially in elevation, partially in longitudinal section, and partially broken away, illustrating the mounting and adjusting of one of the two rolls of the roll group shown in Fig. IX of the drawings.

Fig. XI is a longitudinal sectional view through the roll mounting and roll adjusting means for the roll shown in Fig. X of the drawings, taken in the plane of the irregular section line XI—XI of Fig. X, showing some of the elements for adjusting the roll exposed by breaking away the yoke structure in which the roll is carried.

Fig. XII is a detail view of the roll-carrying yoke shown in Figs. X and XI.

Fig. XIII is a side elevation of apparatus embodying the fundamental principles of my invention, but showing modification over the preceding figures of the drawings in the relative roll arrangement of the apparatus.

Fig. XIV is a vertical sectional view taken approximately centrally of an apparatus organization in accordance with my invention, but of modified form to provide longitudinal adjustment of the primary roll in each of the roll groups, or sets, of the apparatus.

Fig. XV is a cross-sectional view taken on the section line XV—XV of Fig. XIV.

Fig. XVI is a detail sectional view through mounting and adjusting means for a pair of rolls associated with the primary roll of each roll group, or set, corresponding generally to the showing of Fig. IX, but embodying modification permitting adjustment of the pair of rolls and the mounting therefor longitudinally of the apparatus frame.

Fig. XVII is a detail view showing in elevation the housing of the roll mountings shown in Fig. XVI regionally sectioned to show certain of the operating connections thereof, together with means for producing transverse adjustment of the rolls, the assembly being organized to permit adjustment of the roll mountings longitudinally of the apparatus frame in addition to transverse adjustment of the rolls.

Referring first to the less specialized form of apparatus as shown in Figs. II to XII inclusive of the drawings, and in Figs. Ia and Ib, it will be seen that in its general organization my apparatus follows conventional cross-rolling apparatus usable for straightening and otherwise finishing round metallic stock. That is, it comprises an entering set of cross rolls and a leaving set of cross rolls; the rolls being concavely contoured in each set to form a pass, together with one or more intermediate rolls which may contact and exert pressure on the stock between the entering and leaving roll groups, or sets. As above noted, the function of these intermediate rolls is to exert a "gagging" action on the stock tending to straighten out long bends or sweeps as the stock is held by the entering and leaving roll groups. Also the intermediate roll (or rolls) serves to direct the stock in its passage from the entering set to the leaving set of cross rolls. In my organization, however, there is fundamental departure from conventional apparatus of this sort in that both the entering set of rolls and the leaving set of rolls comprises a group of three cooperative rolls rather than the conventional pair of crossed rolls.

Thus in Fig. Ia there is at the entering end of the apparatus a primary roll 1 which is of relatively great size and which is concave, mounted in opposition to two smaller concave secondary rolls 2 and 3. At the leaving end of the apparatus there is a relatively large concave primary roll 4 mounted in opposition with two smaller concave secondary rolls 5 and 6. The arrangement is such that the secondary rolls 2 and 3 are mounted with the axes of both inclined to the axis of the primary roll, and with the axis skewed with respect to the axis of the other. The same organization is found at the leaving end of the machine in which the secondary rolls 5 and 6 are mounted with the axis of each inclined to the axis of the primary roll 4 and with their axes relatively skewed. In Fig. Ia a single roll 7 is mounted to contact the stock A intermediate the bearing points, or "centers," B and C of the two three-roll groups, to exert the conventional gagging effect on stock held in those two groups or sets of rolls.

In Fig. Ib intermediate bearing on the stock A is provided by two rolls 8 and 9 mounted with opposite inclination in the interval between the centers B and C. The two rolls 8 and 9 thus primarily produce the effect of the single intermediate roll 7 shown in Fig. Ia. Advantage in operating on some types and sizes of stock is, however, obtained by the use of two such relatively skewed rolls organized to bear upon the stock from the same side of the pass line, in that they tend to form between them a support for the stock in its passage between the bearing points B and C tending to confine it vertically as well as laterally in the pass line.

Referring now particularly to Figs. II, III, IV and V of the drawings, showing the apparatus organization as a whole, a roll arrangement specifically as illustrated in Fig. Ia of the drawings is shown in a frame for mounting the rolls and for mounting adjusting and operating instrumentalities for the rolls. Thus in Fig. II of the drawings and apparatus frame is shown as comprising end stands 10 and side housings 11. Means for positively driving the primary rolls of the organization are shown as an electrical motor 12, which drives through a gear assembly enclosed in a gear casing 13 mounted on an outboard pillar 14.

The primary rolls 1 and 4 are carried by roll yokes 15 and 16 each of which is rotatably mounted in one of the side housings 11 of the apparatus. Each of the roll yokes has a circular portion provided with slots 17 through which project locking bolts 17a. To each of the roll yokes 15 and 16 there is connected means for producing angular movement of the yokes to give an angular adjustment of the roll axes. These means comprise an adjusting screw 18 provided with a hand-wheel 18a and having hinged connection 18b with the roll yoke 15, and an adjusting screw 19 carrying hand-wheel 19a and having hinged connection at 19b with the roll yoke 16.

Both the primary rolls 1 and 4 are positively driven from the same side of the machine through flexible drive shafts 20 and 21, which give accommodation to angular adjustment of the rolls. The driving connections for drive shafts 20 and 21 are housed in gear casing 13, and receive power from motor 12 by way of shaft 22. As shown in Fig. VI of the drawings, shaft 22 carries a bevel pinion 23 meshing with a bevel gear 24 on an intermediate shaft 25. Shaft 25 carries a pinion 26 meshing with a gear 27 on shaft 28, which shaft carries a pinion 29 meshing with a gear 30 on shaft 31. Shaft 31 in turn carries a pinion 32 with which mesh gears 20a and 21a on the drive shafts 20 and 21.

The above organization of gears and pinions gives a positive drive for roll-actuating shafts 20 and 21, while providing a speed-reducing gear train in which the speed reduction is adequate for the direct driving of the rolls. Referring particularly to Fig. VIII of the drawings, which shows a section taken in the plane of the shafts 20 and 21, it will be seen that these shafts are mounted respectively in floating roller bearings 33 and 34. If then pinion 32 be of a width adequate to permit gears 20a and 21a to remain in mesh with it when axial adjustment of the shafts is made, accommodation is provided to the angular adjustment of the roll yokes 15 and 16 in which the primary rolls are bracketed. That is, the flexible shafts 20 and 21 each of which contains two universal joints 35 will accommodate the angular adjustment of the roll yokes, and in the gear casing the floating bearings 33 and 34 in cooperation with the wide-face pinion 32, with which the gears 20a and 21a mesh, give accommodation to variations in the effective lengths of the drive shafts 20 and 21 caused by their accommodation to the angular adjustment. It is to be understood, with reference to a modification later to be described, that if greater accommodation to change in the effective length of the shafts 20 and 21 be required that accommodation may be provided merely by increasing the width of the pinion 32 and by organizing the floating bearings 33 and 34 for increased longitudinal adjustment of the shafts.

Still referring particularly to Figs. II to V inclusive of the drawings, it will be seen that the intermediate pressure roll 7 is carried by a yoke 7a. In a manner currently well known in the art and as shown for example in United States patent to Thomas W. Hartley No. 1,832,631, the roll 7 is both angularly adjustable and adjustable transversely of the apparatus frame. Thus roll yoke 7a has a stem 36 which is mounted to have both rotation and sliding adjustment transversely of the apparatus frame. An adjusting screw 37, provided with hand-wheel 38, and connected with the stem 36 of the roll yoke in the manner of the Hartley patent produces both transverse and angular adjustment of the roll.

Figs. II to V inclusive of the drawings show two sets of housings which contain mechanism for adjusting the paired secondary rolls 2—3 and 5—6 transversely of the machine toward and from the associated primary rolls, these two installations being identical for each of the pairs of secondary rolls. As shown in these figures of the drawings, each installation comprises a lower gear housing 39 and an upper gear housing 40. A shaft 41 extends into both these housings, and in the interval between the housings is provided with a horizontally arranged hand-wheel 42. Cylindrical bores 43 which provide slidably adjustable mounting for the secondary roll yokes are formed partially by the structure of a side frame 11 and partially by semi-cylindrical caps 44 applied thereto.

Referring now to Fig. IX of the drawings, which is a cross-sectional view through the mounting for one pair of secondary rolls, this view also shows the opposed primary roll schematically for purposes of comparative illustration. It will be seen in this view of the drawings that the bores 43, for mounting the secondary roll yokes, converge toward the primary roll and the pass line through the apparatus. Each of the rolls is carried by a yoke 45, which in turn is carried by a bracket 46. The structure associated with the two rolls being identical, a description of one slidably adjustable mounting will suffice for both. This mounting comprises a stem 47 integral the bracket 46 and keyed in cap 44 for sliding movement longitudinally of bore 43. A screw-box 48 set in stem 47 engages with a lead screw 49 on a stem 50 which carries a bevel pinion 51.

Bevel pinions 51 on both the stems 50 mesh with bevel pinions 52 and 53, both carried by shaft 41 and lying respectively in the lower gear housing 39 and in the upper gear housing 40. Rotation of hand-wheel 42 and shaft 41 to which it is fixed thus rotates stems 50 and lead screws 49 to advance or retract brackets 46 equally in the bores 43, correspondingly to advance or retract the roll yokes 45. In this connection it may be noted that, although the two assemblies are otherwise identical, the two lead screws 49 and their associated screw-boxes are oppositely threaded to give movement of both brackets 46 in the same direction.

Referring not only to Fig. IX but also to the previously considered figures of the drawings, and to Figs. X, XI and XII, there is shown means for angularly adjusting the axes of the secondary rolls, and also means for providing an individual adjustment or retraction of the two secondary rolls of each three-roll group. This individual advancement or retraction may be used to compensate for unequal wear of the rolls, or inequality in the means which produce their simultaneous advancement and retraction. Both these adjustments are effected for each secondary roll of both pairs by operating means available beyond the end stands 10 of the apparatus. These operating means comprise two flexible operating rods 54 and 55 rotatable respectively by means of hand-wheels 56 and 57.

Considering first the angular adjustment of one of the secondary rolls, its adjusting rod 54 in the region of its passage through an end stand is formed as a lead screw of such sort that it is moved both longitudinally and angularly when hand-wheel 56 is rotated. In the region of the roll bracket 46 it carries a cylindrical rack 58 which meshes with a straight-toothed pinion 59 keyed on a reduced portion 60 of a shank integral with the roll yoke. In a terminal region shank portion 60 is threaded to engage a nut 61 and washer 62 carried by the shank portion 60 and normally non-rotatable with respect thereto. Nut 61 and washer 62 are free in bracket 46. Movement of rack 58 carried by rod 54 thus serves to rotate pinion 59, and therefore to rotate yoke 45 to the integral shank portion of which the pinion is keyed. Means operable by rod 55 serve to permit rotation of the yoke or to hold it against rotation. The operating rod 55, which is rotated by hand-wheel 57, passes through an elongate slot 62 in an enlarged base portion 63 of the integral roll-yoke shank and engages wedges 64 by means of its oppositely threaded portions 55a and 55b, to move them both inwardly or outwardly on beveled surfaces 65 of the wedge block. Normally these wedges engage yoke 45 firmly to its bracket 46, but this engagement may be loosened by operation of rod 55 to permit angular adjustment of the roll.

Slight in-and-out adjustment of the roll yoke is effected by adjusting the position of nut 61 on the shank of yoke 45, and correspondingly adjusting the position of wedges 64 on the bevel surfaces 65 of the yoke.

In the apparatus organization above described it will be seen that both of the primary rolls 1 and 4 are driven, and that their axes are angularly adjustable to regulate their angular position with respect to a horizontal plane lying in the pass line. Associated with each of these primary rolls 1 and 4, cooperatively with those rolls to bear upon the stock A in the pass line are the two pairs of secondary rolls 2—3 and 5—6, these rolls being adjustable both as a pair and individually toward and from the associated primary roll, and also being adjustable angularly in planes parallel to the pass line.

Insofar as the structure so far described is concerned, no provision is made for transverse adjustment of the primary rolls. It is to be understood, however, that those rolls may be made adjustable transversely of the apparatus frame in any suitable manner, as by the means hereinafter shown and described in conjunction with means for providing other adjustments of the rolls.

Considering now the apparatus embodiment of my invention as above structurally illustrated and described, and as diagrammatically illustrated in Fig. Ia of the drawings, it will be seen that in each three-roll group, or set, both the secondary rolls contact the stock to force it into the cavity of the primary roll and definitely restrain or confine the stock in that position. The relative angularity of the rolls and the concave formation of the opposed primary roll thus causes each three-roll group to function as a straightening pass, in which the stock is deflected and short bends or kinks are broken down. It is true that straightening is also done in a two-roll pass of more conventional sort. In the three-roll pass, however, the support and restraint of the stock by the rolls themselves gives a more effective working within the pass. It will also be seen that the three rolls of each group are relatively so arranged that in their contact with the stock they do not exert diametrically opposed pressures on the stock. It is particularly apparent in Fig. IX of the drawings, that each roll group provides a funnel-shape pass entry which tends to receive and guide the stock into the more constricted region of the pass through the roll group.

Figs. Ia and IX of the drawings also make it clear that the support to the stock is such as to eliminate the necessity for stationary guides, and that the stock being guided by elements which contact it with rolling friction rather than sliding friction, a more positive pressure may be brought to bear in distributed manner around the stock without marring its surface or exerting a deforming pressure on it. The stock being firmly gripped between the two bearing regions B and C, the intermediate pressure roll is more effective in breaking down long bends or sweeps in the stock than is possible when the stock is held merely by two pairs of opposed cross rolls supplemented by stationary guides, which latter limit movement of the stock through the pass line but do not positively grip and restrain the stock.

The width of the pass line being adjustable to stock of different sizes by advancing and retracting the two secondary rolls of each three-roll group, and both the primary roll and the two secondary rolls being axially adjustable, the pass through the apparatus may be adjusted to stock of different sizes while maintaining suitable line contact of all the rolls of each group with the stock. That is, the angle of roll crossing may be increased with stock of the larger sizes, and decreased with stock of the smaller sizes to maintain an adequate area of contact of all the rolls with the stock, while maintaining a speed of stock travel and a pressure on the stock commensurate with the character of the stock and the work to be performed on it.

Whereas both the secondary rolls are adjustable as a unit toward and from the primary roll as a feature of simplification in structure and in operation, it is both possible and practical individually to adjust the secondary rolls toward and from the primary rolls as by extending stems 47 which carry lead screws 49, and applying hand-wheels to the individual stems. In such case micrometer dials associated with each of the stems will indicate advancement and retraction of the secondary rolls as to make it easy equally to adjust them toward and from the primary roll.

The modification shown in Fig. XIII of the drawings, and which is schematic in nature, indicates that the apparatus organization may involve a vertical rather than a horizontal opposition of the secondary rolls to the primary roll in each of the three-roll groups without departure from the principles and conventional effects involved in my invention. Thus the apparatus modification shown in Fig. XIII of the drawings comprises two end stands 66, a base 67, and a canopy 68. The side frames which would be provided also in this modified embodiment are omitted for simplicity of illustration, as are also most of the means for driving and for adjusting the rolls. This figure of the drawings does, however, show two relatively large concave primary rolls 70 and 71 mounted in brackets 69, in opposition to two pairs of secondary rolls 72—73 and 74—75 carried in brackets 76 having a suspended mounting in canopy 68. This figure of the drawings also shows an intermediate pressure roll 77 carried by bracket 78 and arranged to be brought vertically to bear upon the stock A in the interval between the two three-roll groups. A handwheel 79 is shown for moving intermediate pressure roll 77 vertically and from the pass line, and hand-wheels 80 and 81 are provided for the actuation of adjusting means for the paired secondary rolls which may be analogous to or identical with the roll adjusting means shown in the preceding figures of the drawings. Other elements are omitted, as this figure of the drawings is intended merely schematically to illustrate a vertical rather than a horizontal arrangement of the rolls.

The modifications in apparatus shown in Figs. XIV to XVII inclusive of the drawings may be incorporated individually in a straightening machine embodying the principles of my invention, but desirably are both incorporated in the same apparatus. Of these two modifications, which thus may be considered either individually or collectively, one provides for adjustment of the primary rolls longitudinally of the apparatus frame and of the pass line, and the other provides for the adjustment of the two secondary rolls of each group longitudinally of the apparatus frame and of the pass line. The primary purpose of these adjustments is to increase the firmness of the gripping action of the three-roll groups on the stock, thus increasing the effectiveness of the pressure roll or rolls mounted between these groups intermediately to bear against the stock as held by them in its passage through the apparatus.

Referring first to the modification which provides longitudinal adjustment of the primary roll in each of the three-roll groups, and which provides also for adjustment of the primary rolls transversely of the machine, it will be seen by referring to Fig. XIV of the drawings that the structure therein shown closely parallels the structure shown in Fig. V of the drawings, and it is necessary, therefore, merely to point out those structural features in which difference lies. In the structural organization of Fig. XIV the yokes 15 and 16 are identical with the similar elements 15 and 16 of Fig. V, and similarly comprise circular plate portions having therein slots 17 through which locking bolts 17a pass. In this and other respects the mounting structure for the two primary roll is identical, so that a description of one mounting assembly will serve for both.

As appears in Fig. XV, the stem 82 of the roll yoke rests in a slide block 83 which is slidable longitudinally of the apparatus frame in a slot 84 extended longitudinally of side frame 11a in which the primary rolls are mounted. Retaining plate 85 is secured to slide block 83 by a portion 86 which extends into a seat in the slide block, and is formed regionally to bear against the surfaces 87 of the side frame which bound the slot 84 and against which surfaces the slide block moves in its longitudinal adjustment. The roll yoke is held against the slide block and clamped to the frame by means of the locking bolts 17a which lie in slots 17 in the circular extension of the yoke. These bolts extend through circular holes in slide block 83 and through horizontal slots in the side frame. They also pass through circular holes in retaining plate 85.

In the same manner as provided in the structure illustrated in the preceding figures of the drawings, angular adjustment of the roll may be made by loosening locking bolts 17a and turning the roll yoke angularly with respect to the slide block by which it is carried, the locking bolts being retightened to hold the roll yoke in its angularly adjusted position. In order to avoid complicated structure for producing angular adjustment of the roll yoke while permitting its adjustment longitudinally of the machine frame, I provide a simple operating handle 88 to replace the adjusting screw included in the apparatus as shown in preceding figures of the drawings.

As shown, spacers 89 which are slotted to embrace locking bolts 17a are inserted between the inner face of the side frame 11a and the outer faces of flanges 83a of the slide block. For longitudinal adjustment, the engagement between the elements of the assembly is loosened by retracting nuts 90, which are carried by locking bolts 17a and which bear against the outer faces of retaining plates. The slide block and the entire assembly secured to it may then be shifted longitudinally of the apparatus frame by propulsion with a crowbar, adjusting screw, or other suitable means.

Adjustment of the primary roll transversely of the apparatus may similarly be effected by retracting or removing nuts 90 and forcing slide block 83 transversely of the apparatus in the slot 84 of the side frame in which it lies. No means for producing such adjustment is shown, but the adjustment may be made by use of a crowbar or other removable agency. It will at once be apparent, however, that the transverse adjustment may readily be made by some means such as a lead-screw carried by retaining plate 85. It may be explained that spacers 89 which lie between the flanges 83a of the slide block and the opposed face of the side frame give a solid backing for the slide block and the roll yoke. If then the space between flanges 83a of the slide block and the face of the side frame 11a be increased by moving the flange of the slide block and the roll yoke away from the face of the side frame, a spacer of greater width is substituted to compensate for the increased width of the interval. It will readily be apparent that other means for adjusting the primary roll transversely of the apparatus frame may consist of wedges, which replace spacers 89 and which tend when forced inwardly toward the axis of the roll yoke to increase the interval between the flanges of the slide block and the opposed face of the side frame. Such wedges may be retracted when the slide block and roll yoke are moved oppositely by, or with the assistance of, the tightening of nuts 90 against retaining plate 85.

Referring now particularly to Figs. XVI and XVII of the drawings which show a mounting for a pair of the secondary rolls providing adjustment of the rolls longitudinally of the apparatus frame and the pass line, the structure shown in Fig. XVI is generally analogous to that shown in Fig. IX. Thus the roll-mounting brackets designated 91 in Fig. XVI of the drawings have integrally formed therewith stems 92 which lie within tubular bores 93 provided interiorly of longitudinally adjustable casing elements 94 and 95. These stems 92 are adjustable longitudinally of the bores 93, in a manner identical with that previously described, by means of adjusting screws 96 which are oppositely threaded in nuts 97 in the stems 92, and which carry bevel gears 98. Stems 92 are slidably held in the bores of casings 94 and 95 by keys 99 which engage in key-ways formed in the bores of the casings and which are held longitudinally of the stems by dowel pins 100. Each of the tubular casings 94 and 95 constitutes in effect a slide block which has a dove-tail engagement with a plate 101 secured to a modified structure 11b of the side frame.

Casings 94 and 95, because of their arrangement as slide blocks, are thus adjustable longitudinally of the apparatus side frame, carrying with them the roll-mounting brackets 91 and the roll yokes and rolls terminally mounted on the brackets. The casings are individually held in selected position longitudinally of the apparatus frame by wedges 102 which have an interlocked engagement at 103 with an L-shape flange 104 carried by each of the casing elements, and which may be forced inwardly between the surface of the frame elements and the flange 104 of the casing by means of set screws 105 mounted in the inwardly extended legs of the L-shape flanges 104.

For longitudinal adjustment of the casings as slide blocks on the frame structure, the set screws 105 are retracted to loosen wedges 102 and each of the casings is then adjusted longitudinally to its desired position in which set screws 105 are utilized to clamp the casings to the frame. The interlocking arrangement 103 of the wedges 102 and L-shape flanges 104 causes the wedges to be carried when the casings are moved longitudinally of the frame. As above noted, the adjustment of the casings may be individually made.

I have provided means associated with slide blocks 94 and 95 which provide for actuating adjusting screws 96 to advance or retract rolls ultimately supported by brackets 91 within reasonable limits of longitudinal adjustment of the slide blocks. Such means are shown in Fig. XVII of the drawings which has the outer end of the upper slide block or casing 94 cut away to show the bevel gear 98 carried by its adjusting screw 96. Such means comprise two gear casings 106 and 107, the upper one of which 106 has its cover removed to expose the operating connections therein. It is to be understood that the operating connections in the lower gear casing 107 are identical therewith. These connections comprise a vertical shaft 108 having fixed thereto a handwheel 109 and carrying at both its ends bevel pinions 110, the upper one of which is shown exposed in Fig. XVII. This bevel pinion 110 meshes with a bevel gear 111 fixed on a tubular interiorly splined shaft 112 which engages with the splined region of a cross shaft 113 which latter carries a bevel pinion 114 meshing with bevel gear 98 in slide block casing 94. Longitudinal adjustment along the length of the splines of tubular shaft 112 and cooperatively splined shaft 113 may thus be made while preserving driving connection with adjusting screws 96 to advance or retract the roll-mounting brackets in slide block casings 94 and 95. It will be understood that either of the slide block casings 94 and 95 may be moved with respect to the setting of its associated gear casing 106 and 107 without adjustment of the other slide block casing.

It should be understood that although the organization above described provides for simultaneous adjustment of both the secondary rolls as a unit toward and from their associated primary rolls, these rolls may be made individually adjustable merely by providing for the independent rotation of the two splined shafts 113 and 115 associated respectively with the two slide block casings 94 and 95.

It will be observed that in providing for longitudinal adjustment of the pairs of secondary rolls opposed to the two primary rolls of the apparatus, no provision for longitudinal adjustment of the intermediate pressure roll 7 is made. It is, however, to be understood that if such adjustment appear desirable, longitudinal movement of the pressure roll mounting may be provided by structure such as that disclosed in Hartley Patent No. 1,832,631 to which reference has been above made, and that this adjustment may be provided either in association with the adjustments shown respectively in Figs. XIV and XV and Figs. XVI and XVII of the drawings, or may be provided in the less specialized apparatus organization shown in preceding figures of the drawings.

It will be observed from a consideration of Figs. IX and XVI of the drawings that in all modifications of the apparatus herein shown the roll-mounting brackets for the paired secondary rolls are arranged to advance and retract those rolls along convergent paths which intersect at a point beyond the center line of the pass. In terms of structure, that means the convergent paths of the rolls are along the axes of the integral stems of the roll-mounting brackets rather than along the axes of the shanks of the yokes which directly carry the rolls. This is in line with the structural disclosure of my application Serial No. 350,390, filed August 3, 1940, of which this application forms a continuation-in-part, and of my companion application Serial No. 431,737, filed February 20, 1942, which is also a continuation-in-part of that earlier application. This arrangement gives an accommodation which preserves an optimum grouping of the rolls around the pass line in making adjustment to different sizes of stock without transverse or lateral movement of the primary roll, and avoids the necessity for such transverse adjustment. Such adjustment of the primary rolls laterally of the apparatus may, however, be desirable if wear adjustment of the secondary rolls involves solely a substantial adjustment along their yoke axes.

If then it is proposed that lateral adjustment of the primary roll is to be made in conjunction with transverse adjustment of the paired secondary rolls, to advance and retract both elements substantial distances in making accommodation to different stock diameters, it is desirable that the structure be modified sufficiently to provide adjustment of the secondary rolls toward and from the pass line along lines which coincide or substantially coincide with the axes of the secondary roll yokes. In the apparatus organization as shown in Figs. XIV to XVII inclusive, provision is made for limited adjustment of the secondary rolls along the axes of the secondary roll yokes. This adjustment may, if desired, be used to give a pass adjustment within moderate limits by advancing or retracting both the primary roll and its associated pair of secondary rolls.

Special advantage is obtained by means of the longitudinal adjustment of the primary rolls and opposed secondary rolls of the apparatus relatively to each other, and to the center line of the pass as defined by the intermediate pressure roll. In this connection attention is directed to Figs. Ic and Id of the drawings which illustrate diagrammatically relative positions of the rolls in the seven-roll organization made in accordance with my invention. In Fig. Ic the primary rolls stand at the same position from the intermediate pressure roll 7 as in Fig. Ia of the drawings, but the two pairs of secondary rolls 2—3 and 5—6 mounted in opposition to those primary rolls to form two three-roll groups are adjusted as pairs so that the bearings B and C in the two-roll groups are separated from each other an increased distance with respect to the intermediate pressure roll 7. This positioning gives a longer center between the bearings points B and C and the intermediate pressure roll, and this is of advantage in acting upon stock of relatively great diameter. The chief advantage derived from such adjustment is, however, that the stock is forced against regions of the primary rolls removed from the deepest regions of their cavities, or otherwise expressed, the regions of least diameter of the primary rolls. Since the stock tends normally to bear most firmly against the rolls along the lines of their least diameter, the gripping effect of the group on the stock is increased by bringing the secondary rolls to bear at another region longitudinally of the primary roll axes, so that the group has in effect a staggered bearing on the stock rather than the directly opposed bearing obtained when the secondary rolls are in opposition to the lines of least diameter of the primary rolls.

If it be desired to obtain the staggered bearing effect shown in Fig. Ic without moving the bearing regions B and C away from the transverse center of the pass, the same effect may be obtained by adjusting the primary rolls toward each other and toward the transverse center of the pass at which intermediate pressure roll 7 is placed. In accommodation to small stock diameters it may even be desirable to obtain the staggered gripping effect by shifting the pairs of secondary rolls toward each other and toward the transverse center of the pass. I have found it generally desirable when longitudinal adjustment of the rolls is not provided, to mount the pairs of secondary rolls in positions approximating those in which they appear in Fig. Ic, so that staggered bearing points of the roll group on the stock are obtained. Also when a particularly tight gripping of the stock is desired, or when other considerations may make it advantageous, the two secondary rolls 2—3 and 5—6 of each group may be adjusted into different longitudinal positions. This is possible in the modified apparatus embodiment of my invention shown in Figs. XVI and XVII in which the two slide block casings 94 and 95 are independently adjustable longitudinally of the apparatus frame.

Many combinations in the relative positioning of the rolls are possible in apparatus which embodies both the longitudinal roll adjustments shown in Figs. XVI and XVII, and if the intermediate pressure roll be likewise adjustable longitudinally of the apparatus frame the possible combinations in relative roll positioning is still further increased. Fig. Id of the drawings shows an adjustment which provides the same staggered bearing on the stock which is provided by the relative roll positioning shown in Fig. Ic, but in which both the primary rolls 1 and 4 and the two pairs of secondary rolls 2—3 and 5—6 are moved as groups away from each other and away from the transverse center of the pass at which the roll 7 is positioned. This adjustment may desirably be made for acting on stock of particularly large diameter, such as large diameter tubes. It is to be understood that all the adjustments shown and discussed are appropriate and useful in a roll organization which includes paired intermediate pressure rolls 8—9, as shown in Fig. Ib, instead of the single pressure roll 7 shown in Fig. Ia and which has been used as illustrative in Figs. Ic and Id illustrating roll adjustments.

Special advantages deriving from the more specialized modifications in the apparatus embodiment of my invention and in method similarly arising from the specialized action on the stock which I provide have been discussed in detail above. It should, however, be borne in mind that fundamental advantages both in apparatus and in method derive from a cross-roll straightening and finishing operation in which three rolls having their axes inclined to a common center and to the axes of each other are relatively so arranged that two of the said rolls act to force the stock into the cavity of the third roll. Particular advantage is to be found in cross-roll straightening and finishing apparatus, and in a method of cross-roll straightening and finishing which may be conducted therein, in which the stock is gripped by two three-roll groups of skewed rolls organized as above described in cooperation with an intermediate pressure roll, or rolls, organized deflectingly to bear on the stock gripped in the two three-roll groups intermediate the points at which the stock is gripped.

As above noted, many modifications in the structure and organization of apparatus elements and in specific method steps in accordance with my invention may be made within the bounds of that invention as defined in the appended claims. Certain of such modifications have been specifically pointed out and others are inherent in the apparatus organization and method steps as above described.

I claim as my invention:

1. In a cross-roll straightening machine, a three-roll pass assembly comprising a main frame having a primary roll arranged therein, a secondary frame associated with said main frame, and longitudinally movable therealong, a pair of guides formed in said secondary frame and converging toward said primary roll and the pass line, a corresponding pair of brackets associated with said guides for reciprocal movement therealong, a corresponding pair of secondary rolls carried by said brackets and connected thereto to pivot upon axes angularly related to the paths of movement of said brackets for angular adjustment of said secondary rolls about said axes and juxtaposed to said primary roll to form a pass for the reception of round stock therebetween.

2. In a cross-roll straightening machine, a three-roll pass assembly comprising a main frame having a primary roll arranged therein, a secondary frame associated with said main frame, and longitudinally movable therealong, a pair of guides formed in said secondary frame and converging toward said primary roll and pass line, a corresponding pair of brackets associated with said guides for reciprocal movement therealong, a corresponding pair of roll yokes pivoted to said brackets upon axes angularly related to the paths of movement of said brackets and converging toward the primary roll and pass line for angular adjustment about said axes, a corresponding pair of secondary rolls carried by said yokes and juxtaposed to said primary roll to form a pass for the reception of round stock therebetween.

3. In a cross-roll straightening machine, a three-roll pass assembly comprising a main frame having a primary roll arranged therein to form one side of the pass; a secondary frame associated with said main frame, a pair of guides formed in said secondary frame and converging toward said primary roll and the pass line from the side opposite said primary roll, brackets associated with said guides for reciprocal movement therealong to permit adjustment of said brackets in the paths of motion thereof, secondary roll yokes carried by said brackets and swiveled thereto to pivot on axes angularly related to the paths of movement of said brackets and converging toward the primary roll and pass line for angular adjustment about said axes, secondary rolls carried by said yokes.

4. In a cross-roll straightening machine, a three-roll pass assembly comprising a main frame having a primary roll arranged therein to form one side of the pass; a secondary frame associated with said main frame, a pair of guides formed in said secondary frame and converging toward said primary roll and the pass line from the side opposite said primary roll, stems slidably engaged in said guides for adjustment therealong and terminating in brackets angularly offset thereto, pins pivotally connected to said brackets in angular relation to the paths of motion of said stems and converging toward the pass line, secondary roll yokes carried by said pins for angular adjustment about the axes of said pins, secondary rolls carried by said yokes.

5. In a cross-roll straightening machine, a three-roll pass assembly comprising a main frame having a primary roll arranged therein to form one side of the pass; a secondary frame associated in the said main frame and having a pair of tubular guides formed therein converging toward the pass line from the side opposite said primary roll, stems slidably engaged in said guides for adjustment therealong, roll-yokes converging toward the pass and connected to said stems as the pass ends thereof and pivoted thereto on axes angularly related to the paths of motion of said stems, means to fix said yokes in adjustment about said axes, secondary rolls carried by said yokes, a rotatable control shaft arranged in said secondary frame, rotatable secondary shafts having threaded engagement with said stems at the rear ends thereof and connected to said control shaft whereby to reciprocate said stems along said guides upon rotation of said control shafts.

6. In a cross-roll straightening machine, a three-roll pass assembly comprising a frame having a primary concave roll arranged therein to form one side of the pass, a pair of ways arranged in said frame longitudinally of the pass and opposite said primary roll, carriages movable along said ways for adjustment relative to each other longitudinally of the pass, roll supports mounted upon said carriages and movable therealong transversely of the pass and converging theretoward, a secondary roll mounted in each of said supports and juxtaposed to said primary roll to form a pass for the reception of round stock therebetween.

7. In a cross-roll straightening machine, a three-roll pass assembly comprising a frame having a primary roll arranged therein to form one side of the pass; a pair of ways arranged in said frame longitudinally of the pass and opposite said primary roll and tilted convergently toward the pass, carriages movable along said ways for adjustment relative to each other longitudinally of the pass, guides formed in said carriages and converging toward said primary roll, stems arranged in said guides and reciprocally movable therein, roll yokes carried by said stems at the pass ends thereof and secondary rolls carried by said yokes in juxtaposition to said primary roll to form therewith a pass for reception of round stock therebetween.

8. In a cross-roll straightening machine having plural three-roll passes and at least one roll arranged between two three-roll passes to deflect stock from the pass line of the machine; a pass assembly comprising a frame having three carriage-ways arranged therein extending longitudinally of the pass and peripherally spaced therearound, a carriage movable along each said ways for adjustment longitudinally of the pass, a roll carried by each of said carriages and juxtaposed to the other rolls to form a pass therewith for reception of round stock therebetween.

9. In a cross-roll straightening machine having plural three-roll passes; a pass assembly comprising a frame having three carriage-ways arranged therein extending longitudinally of the pass and peripherally spaced therearound, a carriage movable along each said ways for adjustment longitudinally of the pass, a roll carried by each of said carriages, two of said carriages having guides formed therein transversely of the pass and converging thereon to direct the respective rolls in convergent paths toward the pass line and the roll carried by the other carriage to form therewith a pass for the reception of round stock therebetween.

10. In a cross-roll straightening machine, a pass assembly comprising a frame having a series of ways arranged therein longitudinally of the pass and circumferentially spaced thereabout, one of said ways having a carriage movable therealong and a primary roll carried by said carriage, two of said ways being tilted to laterally converge toward the pass, a carriage movable along each of said tilted ways and having a guide formed therein transverse to the path of travel of said carriage and substantially parallel to the angle of tilt of said tilted ways, a roll arranged in said carriage and associated with said guide for direction thereby toward the primary roll to form therewith a pass for the reception of round stock therebetween.

11. In a cross-roll straightening machine, a pass assembly comprising a frame having a series of ways arranged therein longitudinally of the pass and circumferentially spaced thereabout, one of said ways having a carriage movable therealong and a primary roll carried by said carriage, two of said ways being tilted to laterally converge toward the pass, a carriage movable along each of said tilted ways and having a guide formed therein transverse to the path of travel of said carriage and substantially parallel to the angle of tilt of said tilted ways, a bracket arranged in said carriage and associated with said guide for direction thereby, a roll-yoke connected to said bracket and a roll carried by said yoke.

12. In a cross-roll straightening machine having plural three-roll passes; a pass assembly comprising a frame having at least two carriage-ways therein arranged longitudinally of the pass, a roll-carriage movable along each said ways and means for adjusting same along the ways longitudinally of the pass, a small secondary concave roll carried by each of the said carriages, and a long concave primary roll mounted in opposition to both the two said adjustable longitudinally secondary rolls to form a pass therewith for reception of round stock therebetween.

13. In a cross-roll straightening machine having plural three-roll passes; a pass assembly comprising a frame having at least two carriage-ways therein arranged longitudinally of the pass, a roll-carriage movable along each said ways and means for adjusting same along the ways longitudinally of the pass, roll yokes rotatably mounted in each of the said carriages, a small secondary concave roll carried by each of the said yokes, a long concave primary roll arranged in opposition to both the said secondary rolls to form a pass therewith for the reception of round stock therebetween, and a rotatable yoke mounting the said primary roll, the three said roll yokes each having means associated therewith to rotate same about such roll yoke axes of rotation normal to the axis of rotation of its associated roll such roll yoke axes intersecting the longitudinal center line of the said pass.

14. In a cross-roll straightening machine having plural three-roll passes; a pass assembly comprising a frame having mounting structure for three rolls therein spaced peripherally around the pass, the mounting structure for each of the three rolls comprising a rotatably mounted roll yoke, and a long primary roll carried in one roll yoke, two small secondary rolls carried in the other yokes the said roll yokes each having means associated therewith to rotate same about an axis normal to the axis of rotation of its associated roll such roll yoke and axes intersecting the longitudinal center line of the pass, and means connected to the secondary roll yokes to adjust them to and from the primary roll.

15. In a cross-roll straightening machine having plural three-roll passes; a pass assembly comprising a frame, a roll mounting in said frame comprising a roll yoke carrying a primary roll therein means to rotate same about an axis normal to the axis of rotation of its associated roll the roll yoke axis intersecting the longitudinal center line of the pass, two carriageways in the said frame spaced with the said primary roll mounting peripherally around the pass and arranged to converge toward the pass, roll-carriages in said converging ways and means to move same movable toward and away from the said primary roll, a roll yoke and a secondary roll carried thereby on each said roll-carriage to form in juxtaposition with the said primary roll a pass for the reception of round stock therebetween, each said yoke having means associated therewith to rotate same in its associated carriage about an axis normal to the axis of rotation of its associated roll such roll yoke axes intersecting the longitudinal center line of the pass, and means connected to the secondary roll yokes to adjust them to and from the primary roll.

16. In a cross-roll straightening machine having plural three-roll passes and at least one roll arranged between two three-roll passes to deflect stock from the pass line of the machine; a pass assembly comprising a frame, a roll mounting in said frame comprising a roll yoke carrying a primary roll, means to rotate same about an axis normal to the axis of its associated roll said roll yoke axis intersecting the longitudinal center line of the pass, two roll-carrying carriages spaced with the said first-named roll mounting peripherally around the pass and means to move same in the said frame to carry secondary rolls mounted therein in convergent paths toward and away from the said first-named roll, a roll yoke and a roll carried thereby on each said roll-carriages to form in juxtaposition with said primary roll a pass for the reception of round stock therebetween, each said roll yoke having means associated therewith to rotate same about an axis normal to the axis of rotation of its associated roll and such last named roll yoke axes intersecting the longitudinal center line of the pass, and means connected to the secondary roll yokes to adjust them to and from the primary roll.

JOHN BLAIR SUTTON.